(12) United States Patent
Na et al.

(10) Patent No.: US 7,860,067 B2
(45) Date of Patent: Dec. 28, 2010

(54) METHOD FOR DYNAMIC ADDRESS ALLOCATION USING MOBILE IP IN WIRELESS PORTABLE INTERNET SYSTEM

(75) Inventors: Jee-Hyeon Na, Daejeon (KR); Chul-Sik Yoon, Daejeon (KR); Jung-Mo Moon, Seoul (KR); Yeong-Jin Kim, Daejeon (KR); Jee-Hwan Ahn, Daejeon (KR)

(73) Assignees: Electronics and Telecommunications Research Institute (KR); Samsung Electronics Co., Ltd.; KT Corporation; SK Telecom Co., Ltd.; KTFreetel Co., Ltd.; Hanaro Telecom, Inc.

( * ) Notice: Subject to any disclaimer, the term of this patent is extended or adjusted under 35 U.S.C. 154(b) by 864 days.

(21) Appl. No.: 10/588,100

(22) PCT Filed: Sep. 3, 2004

(86) PCT No.: PCT/KR2004/002243

§ 371 (c)(1),
(2), (4) Date: Jun. 14, 2007

(87) PCT Pub. No.: WO2005/074307

PCT Pub. Date: Aug. 11, 2005

(65) Prior Publication Data

US 2008/0037478 A1 Feb. 14, 2008

(30) Foreign Application Priority Data

| Feb. 2, 2004 | (KR) | ................ 10-2004-0006627 |
| May 19, 2004 | (KR) | ................ 10-2004-0035544 |
| Aug. 23, 2004 | (KR) | ................ 10-2004-0066304 |

(51) Int. Cl.
*H04Q 7/24* (2006.01)

(52) U.S. Cl. .......................... 370/338; 709/245
(58) Field of Classification Search ................ 370/329, 370/351–352, 401; 709/245
See application file for complete search history.

(56) References Cited

U.S. PATENT DOCUMENTS

| 2002/0019880 A1* | 2/2002 | Sakakura ............... 709/245 |
| 2002/0118656 A1* | 8/2002 | Agrawal et al. ......... 370/329 |
| 2003/0043781 A1 | 3/2003 | Proctor et al. |

FOREIGN PATENT DOCUMENTS

JP 2000-059839 2/2000

OTHER PUBLICATIONS

Jee-Hyeon NA, "Changes on 802.16e Working Document for IP Address Allocation by Mobile IP", Sep. 4, 2003.

* cited by examiner

*Primary Examiner*—Lester Kincaid
*Assistant Examiner*—Phuoc Doan
(74) *Attorney, Agent, or Firm*—The Farrell Law Firm, LLP

(57) ABSTRACT

In the method for dynamic IP allocation using a mobile IP in a wireless portable Internet system, a MAC message used to register a mobile subscriber station contains a flag including a mobile IP version parameter. Upon checking the mobile IP version, the mobile subscriber terminal transmits a mobile IP registration request message to a base station during MAC connection establishment. The base station transmits a mobile IP registration reply message to the mobile subscriber in response to the received mobile IP registration request message to allocate a dynamic IP address to the mobile subscriber station. The dynamic IP allocation process is performed through a secondary management connection to achieve a rapid handoff without using a connection identifier. In addition, the present invention supports a seamless service and the use of the mobile IP in the IEEE 802.16e wireless

12 Claims, 12 Drawing Sheets

Fig. 9

| Type | Length | Value | Scope |
|---|---|---|---|
| 5.9 | 1 | bit #0 : IPv4 - (301)<br>bit #1 : IPv6 - (302)<br>bit #2 : Mobile IPv4 - (303)<br>bit #3-7 : reserved; shell be sent to zero | REG-REQ,<br>REQ-RSP |

METHOD FOR DYNAMIC ADDRESS ALLOCATION USING MOBILE IP IN WIRELESS PORTABLE INTERNET SYSTEM

TECHNICAL FIELD

The present invention relates to a method for dynamic IP address allocation using a mobile IP in a wireless portable Internet system. More specifically, the present invention relates to a dynamic IP allocation method for providing seamless service during a handover in the IEEE 802.16e MAN (Metropolitan Area Network) system.

BACKGROUND ART

The wireless portable Internet is a next-generation communication system that supports mobility in a LAN data communication system using a fixed access point such as the existing wireless LAN.

A variety of standards for the wireless portable Internet have been suggested, and the international standardization of portable Internet is current in progress, centering on the IEEE 802.16e.

FIG. 1 is a schematic of a wireless portable Internet system.

The wireless portable Internet system basically includes a mobile subscriber station (MSS) 10, base stations 20 and 21 performing wireless communication with the mobile subscriber station 10, routers 30 and 31 being connected to the base stations through a gateway, and an Internet network.

The conventional wireless LAN system such as IEEE 802.11 provides a data communication system capable of wireless communication in a local area centering on a fixed access point. But, the IEEE 802.16 has the limitation that it cannot provide mobility of the mobile subscriber station but simply supports wireless LAN data communication.

The IEEE 802.16, which is the standards for the MAN, refers to a data communication network for the intermediate area between LAN (Local Area Network) and WAN (Wide Area Network).

The wireless portable Internet system under development in the IEEE 802.16e group or the like secures mobility of the mobile subscriber station even when the mobile subscriber station 10 shown in FIG. 1 is moving from a cell managed by the base station 20 to a cell managed by the base station 21, thereby providing a seamless data communication service.

Therefore, the wireless portable Internet system supports a handover of the mobile subscriber station 10 as in the mobile communication service, and performs dynamic IP address allocation according to the movement of the mobile subscriber station.

The mobile subscriber station 10 and the base stations 20 and 21 in the wireless portable Internet system perform OFDMA (Orthogonal Frequency Division Multiple Access) communication. The OFDMA is a multiplexing method that combines the time division multiplexing (TDM) method and the frequency division method using a plurality of orthogonal frequency subcarriers as a plurality of sub-channels. The OFDMA is substantially strong against fading occurring on multi paths, and has a high data transfer rate.

The IEEE 802.16e employs the AMC (Adaptive Modulation and Coding) method that adaptively selects modulation and coding methods by request and acceptance.

FIG. 2 is a hierarchy chart showing the hierarchical structure of a wireless portable Internet system.

The hierarchical structure of the IEEE 802.16e wireless portable Internet system includes a physical layer L10, and MAC (Media Access Control) layers L21, L22, and L23.

The physical layer L10 has a wireless communication function such as modulation/demodulation, coding, and so forth as usually performed by a physical layer.

Unlike a wire Internet system, the wireless portable Internet system has a single MAC layer in charge of different functions rather than multiple layers classified by functions.

Regarding function-specific sublayers, the MAC layer includes privacy sublayer L21, MAC common part sublayer L22, and service specific convergence sublayer L23.

The service specific convergence sublayer L23 has a payload header suppression and QoS mapping function, in consecutive data communication.

The MAC common part sublayer L22 is the core part of the MAC layer that has functions of system access, bandwidth allocation, connection establishment and maintenance, and QoS control.

The privacy sublayer L21 has functions of equipment authentication and security key exchange, and encryption. The equipment authentication is performed only at the privacy sublayer L21; and the user authentication is performed at the upper layer (not shown) of the MAC layer.

FIG. 3 is a schematic diagram showing the connection between the base-station and the mobile subscriber station in the wireless portable Internet system.

The connection is provided between the MAC layer of the mobile subscriber station MSS and that of the base station BS.

The term "Connection C1" as used herein does not refer to a physical connection but a logic connection that includes a basic connection for MAC message transfer, two management connections, and a transport connection for traffic transfer by service flows. The mapping relationship between the MAC peers of the mobile subscriber station MSS and the base station BS includes one primary connection, one basic connection, one secondary management connection, and a plurality of transport connections provided as many as there are service flows.

Hence, the parameter/message as defined on the connection C1 refers to a function executed between the MAC peers. Actually, the parameter/message is processed into a frame, which is transferred through the physical layer and analyzed so as to enable the MAC layer to execute the function corresponding to the parameter/message.

The connection C1, which is established during the initial station registration, includes a basic connection used for MAC message transfer, and a management connection not sensitive to a delay but established during the initial subscriber registration. The management connection is divided into a primary management connection for managing a header for a lower layer, and a secondary management connection for managing a header for an upper layer.

The MAC message transported through the connection C1 includes a connection identifier (CID) used as an address of the MAC layer to identify the connection; a MAP defining the symbol offsets of bursts and sub-channel offsets time-divided by the mobile subscriber station on the downlink/uplink, the number of symbols of the resource allocated, and the number of sub-channels; and channel descriptors (including a DCD (Downlink Channel Descriptor) and a UCD (Uplink Channel Descriptor)) specifying the characteristic of the physical layer according to the characteristic of the downlink/uplink.

The MAC message also includes different messages of request (REQ), response (RSP), or acknowledgement (ACK) functions for various operations.

FIG. 4 is a frame diagram showing the frame structure of the wireless portable Internet system.

The frame is classified into a downlink frame F1 and an uplink frame F2 according to a transfer direction. In the frame diagram, the axis of the ordinate represents sub-channels comprising orthogonal frequencies while the axis of the abscissa represents the time-divided time axis.

The downlink frame F1 includes a preamble, a downlink MAP, an uplink MAP, and a plurality of downlink bursts. The downlink bursts are not subscriber-specific channels or resources, but transfer level specific channels or resources classified by transfer level having a same modulation method or a same channel skill.

The downlink MAP identifies a subscriber using the CID and has offset information, modulation method information, and coding information corresponding to the identified subscriber to allocate resources to the subscriber. The MAP has the characteristic of a broadcast channel and requires high robustness.

The uplink frame F2 has a function of user-specific transfer, and the uplink burst includes user-specific information.

FIG. 5 is a flow chart showing a connection establishment process in the wireless portable Internet system.

When the mobile subscriber station enters the cell of the base station, in step S1, the base station acquires downlink synchronization with the mobile subscriber station, in step S2. With the downlink synchronization acquired, the mobile subscriber station acquires an uplink parameter, in step S3. The parameter includes, for example, a channel descriptor message corresponding to the characteristic (e.g., signal-to-noise ratio) of the physical layer.

The ranging between the mobile subscriber station and the base station is achieved, in step S4. The ranging procedure is correcting and matching timing, power, and frequency information between the mobile subscriber station and the base station, and dividing into initial ranging and a subsequent periodic ranging.

After the completion of the ranging procedure, a negotiation of the basic capacity for connection establishment between the mobile subscriber station and the base station is performed, in step S5. Once the negotiation of the basic capacity is completed, the base station authenticates the mobile subscriber station using an equipment identifier such as the MAC address of the mobile subscriber station, in step S6.

When the mobile subscriber station is authenticated and authorized to use the wireless portable Internet service, the equipment address of the mobile subscriber station is registered, in step S8. Then, an IP address management system such as a DHCP (Dynamic Host Configuration Protocol) server provides an IP address to the mobile subscriber station to establish the IP connection, in step S8.

The mobile subscriber station receiving the IP address performs connection establishment for data transfer, in step S9.

FIG. 6 is a schematic of a conventional dynamic IP allocation system.

The IEEE 802.16 provides a handover function to a mobile subscriber station between base stations BS1 and BS2 so as to provide nobility to the existing fixed subscriber station.

However, the conventional standards not considering the handover (or called "handoff") of the subscriber station sufficiently are problematic in that the session in use is disconnected during a handover of the subscriber station using a dynamic IP.

As illustrated in FIG. 6, upon receiving a dynamic IP address in the cell of the base station 20, the mobile subscriber station 10 requests the DHCP (Dynamic Host Configuration Protocol) of the base station 20. DHCP server 50 allocates a dynamic IP address to the mobile subscriber station 10 in response to the request of the mobile subscriber station. When receiving an IP address of "129.253.250.0" franc the DHCP server, for example, the mobile subscriber station 10 sets the IP address during an IP leasing period to communicate with a terminal node 40.

When the mobile subscriber station 10 moves to the cell of the base station 21 for handover, DHCP server 51 allocates a new IP address to the mobile subscriber station 10. In this case, the terminal node 40 cannot know the new IP address of the mobile subscriber station 10, so the session between the mobile subscriber station 10 and the terminal node 40 is disconnected.

In case of using a mobile IP for seamless service, a dynamic address allocation procedure is necessary during the mobile IP registration process as specified in the mobile IP standards, RFC3344. However, the existing IEEE 802.16e standards, where the connection to the MAC layer for dynamic address allocation using the mobile IP is not established, cannot support the seamless service. Accordingly, the wireless portable Internet subscriber cannot receive seamless service when using a dynamic IP address, thereby restraining the mobility of the subscriber-station.

DISCLOSURE OF INVENTION

Technical Problem

It is an advantage of the present invention to provide a method for address allocation to a mobile subscriber station using a mobile IP so as to use a dynamic IP.

It is another advantage of the present invention to provide a dynamic IP address allocation method for rapid connection establishment in a wireless portable Internet system.

It is still another advantage of the present invention to provide an address allocation method using a mobile IP for saving radio resources.

Technical Solution

In one aspect of the present invention, there is provided a method for dynamic IP address allocation for a mobile subscriber station receiving an IP address allocated thereto in a wireless portable Internet system, the method including: (a) the mobile subscriber station performing initial ranging upon entering a first base station; (b) performing an authentication with the first base station; (c) transmitting a registration request message including a flag set as a mobile IP to the first base station; (d) transmitting a mobile IP registration request message during a MAC connection establishment, in response to an agent advertisement of the first base station; and (e) receiving a mobile IP registration reply message during the MAC connection establishment.

In another aspect of the present invention, there is provided a method for dynamic IP address allocation for a first base station allocating a dynamic IP to a mobile subscriber station in a wireless portable Internet system, the method including: (a) the first base station performing initial ranging with the mobile subscriber station; (b) performing an authentication with the mobile subscriber station; (c) receiving a registration request message including a flag set as a mobile IP to check an IP version; (d) receiving a mobile IP registration request message from the mobile subscriber station during a MAC connection establishment, in response to an agent advertisement; and (e) transmitting a mobile IP registration reply message to the mobile sub-scriber station during the MAC connection establishment.

In still another aspect of the present invention, there is provided a method for registering a mobile IP when an IP mobile subscriber station moves from a first base station to a second base station, the method including: (a) the second base station and the mobile subscriber station performing a handover; (b) the mobile subscriber station performing a reregistration with the second base station; (c) transmitting a reregistration request message including a flag set as a mobile IP to the second base station; (d) the mobile subscriber station acquiring a COA (Care Of Address), in response to an agent advertisement of the second base station; (e) the mobile subscriber station transmitting a mobile IP registration request message for an IP address allocated from the first base station during a MAC connection establishment; (f) the second base station relaying the mobile IP registration request message to the first base station during the MAC connection establishment; and (g) the first base station transmitting a reply message to the mobile IP registration request message to the mobile subscriber-station via the second base station.

In still yet another aspect of the present invention, there is provided a method for a subscriber station to move to a second base station from a first base station and register a mobile IP in a wireless portable Internet system, the method comprising: (a) the second base station and the mobile subscriber station performing a handover; (b) transmitting a registration request message including a flag established by a mobile IP to the second base station; (c) the second base station determining whether the first and second base station have the same subset information; (d) the second base station terminating transmission of an agent advertisement to the subscriber station when the first and second base station are found to have the same subset information; and (e) registering a mobile IP through a secondary management connection when the first and second base station are found to have different subset information.

BRIEF DESCRIPTION OF THE DRAWINGS

The accompanying drawings, which are incorporated in and constitute a part of the specification, illustrate an embodiment of the invention, and, together with the description, serve to explain the principles of the invention;

FIG. 9 is an illustration of an IP version parameter format used in an embodiment of the present invention;

BEST MODE FOR CARRYING OUT THE INVENTION

Figure 1:
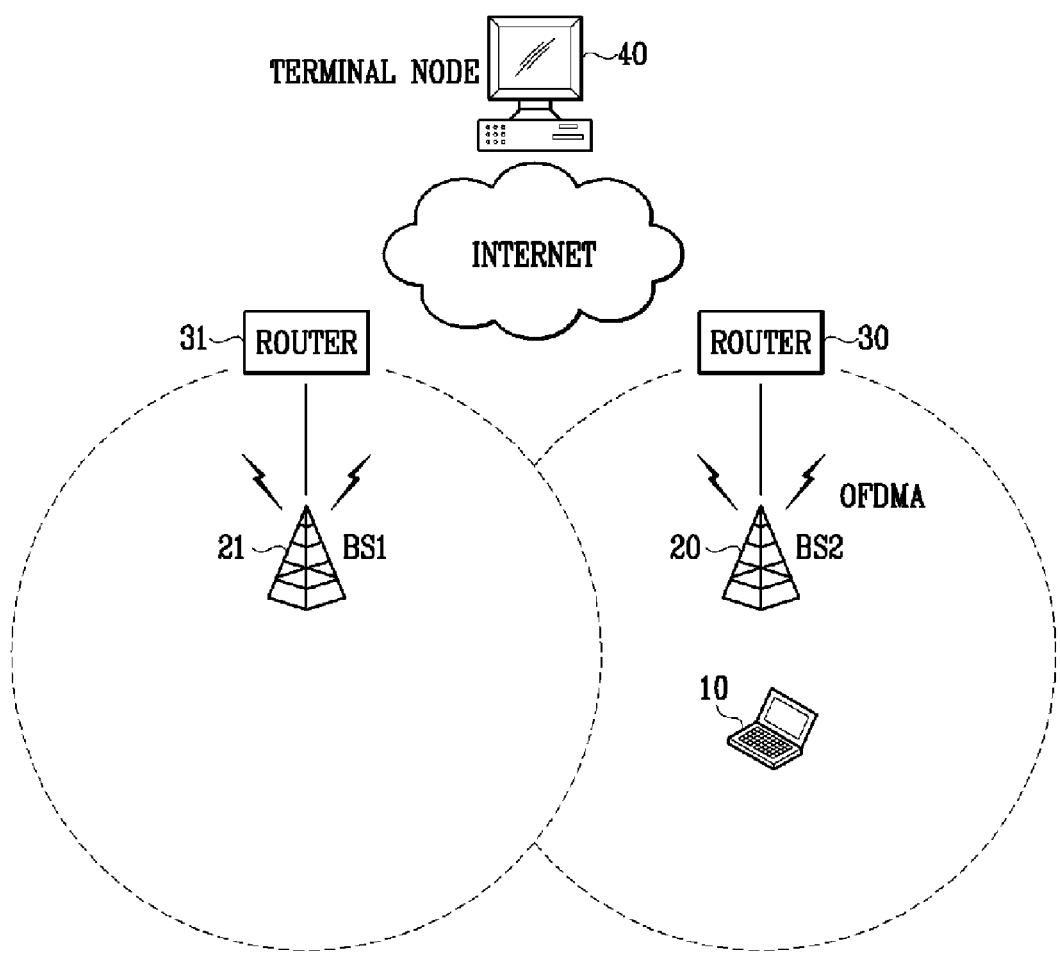
FIG. 1 is a schematic diagram showing the outline of a wireless portable Internet system.
Figure 2:
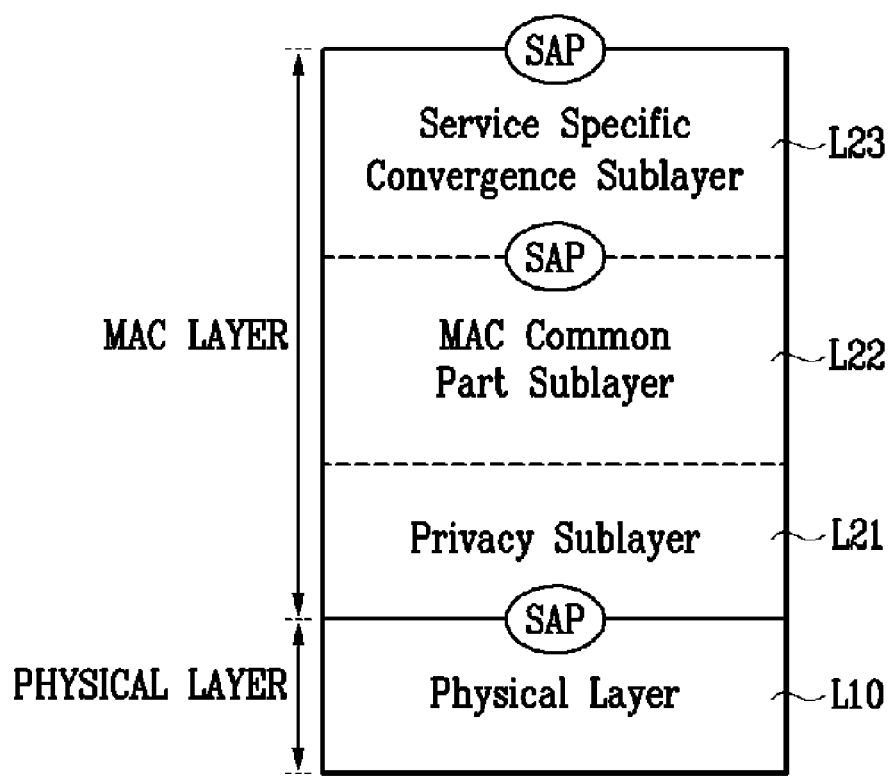
FIG. 2 is a hierarchy chart showing the hierarchical structure of a wireless portable Internet system.
Figure 3:
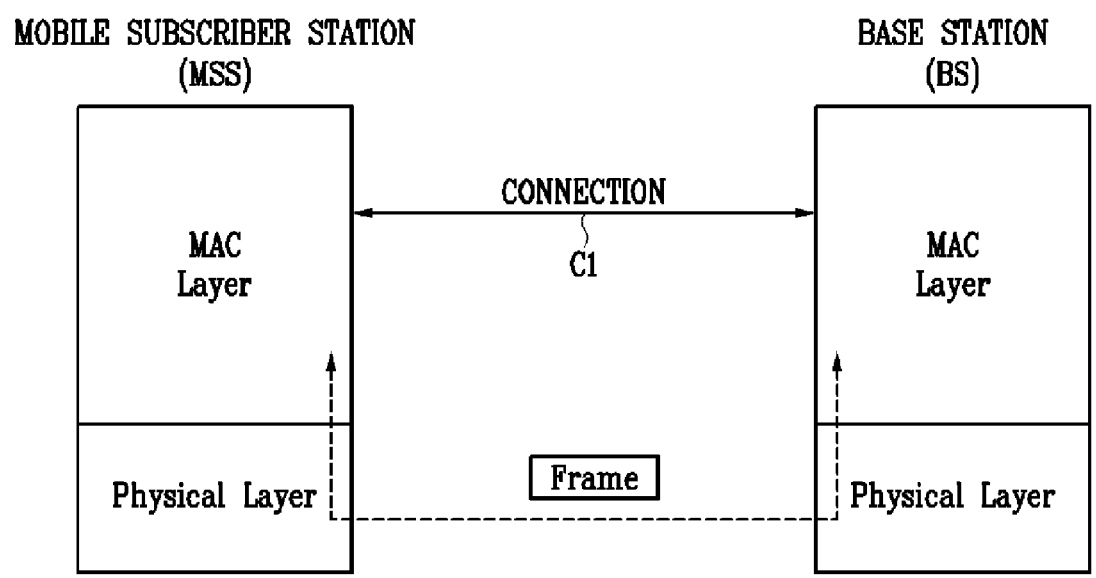
FIG. 3 is a schematic diagram showing the connection-structure between a base station and a mobile subscriber station in a wireless portable Internet system.
Figure 4:
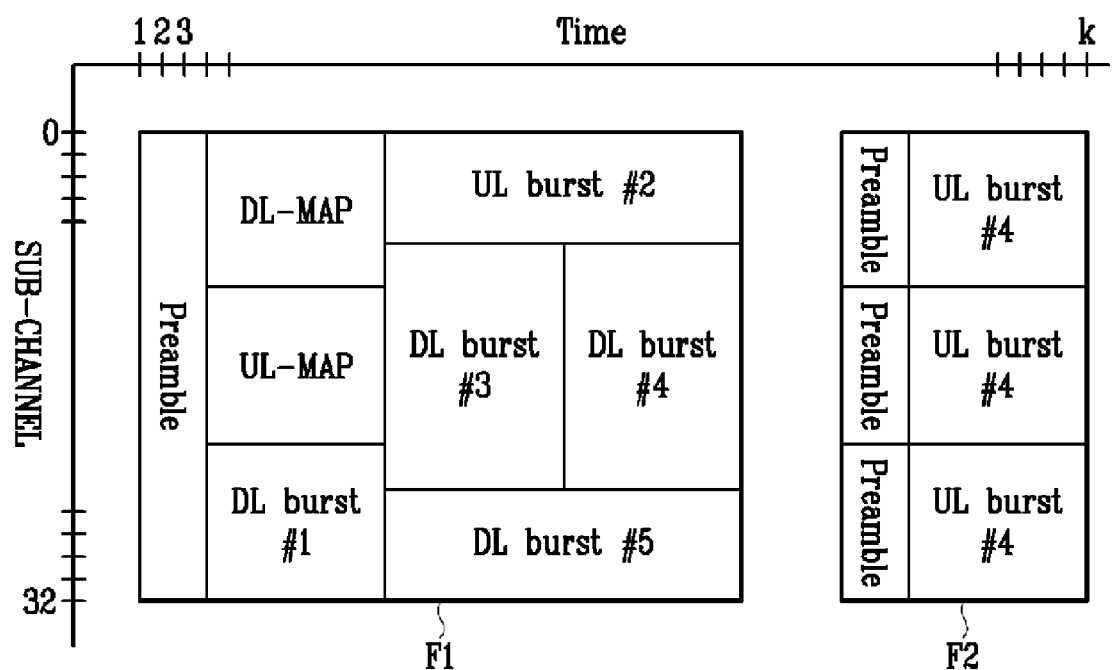
FIG. 4 is a frame diagram showing the frame structure of a wireless portable Internet system.
Figure 5:
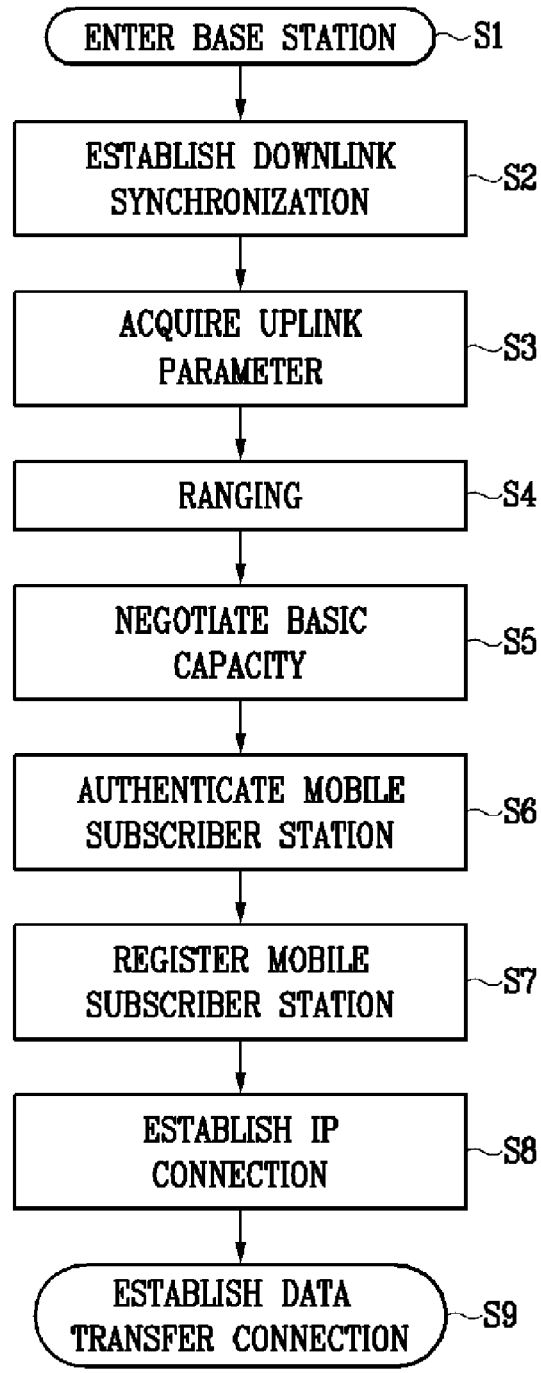
FIG. 5 is a flow chart of a connection establishment process in a wireless portable Internet system.
Figure 6:
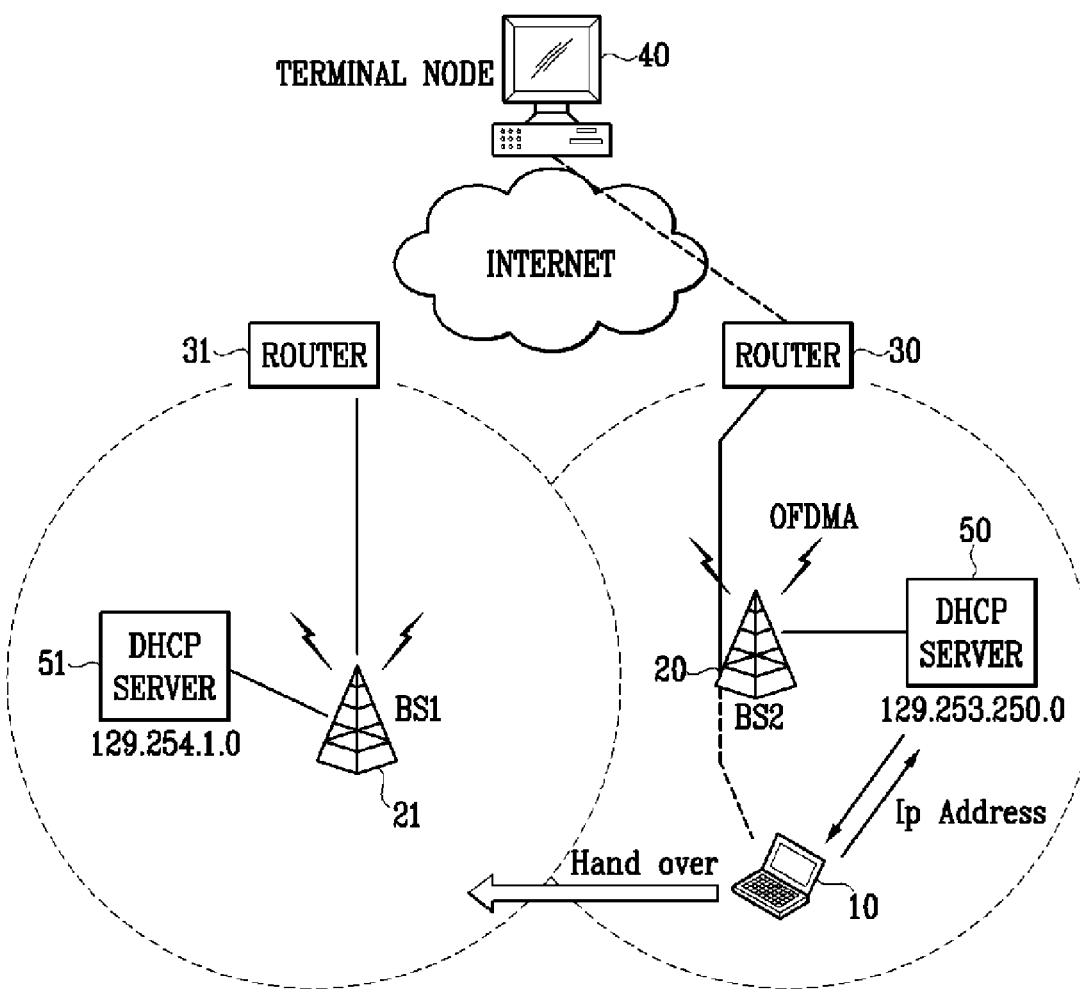
FIG. 6 is a schematic of a conventional dynamic IP allocation system.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

Hereinafter, a dynamic IP allocation system and method according to an embodiment of the present invention will be described in detail with reference to the accompanying drawings.

Figure 7:
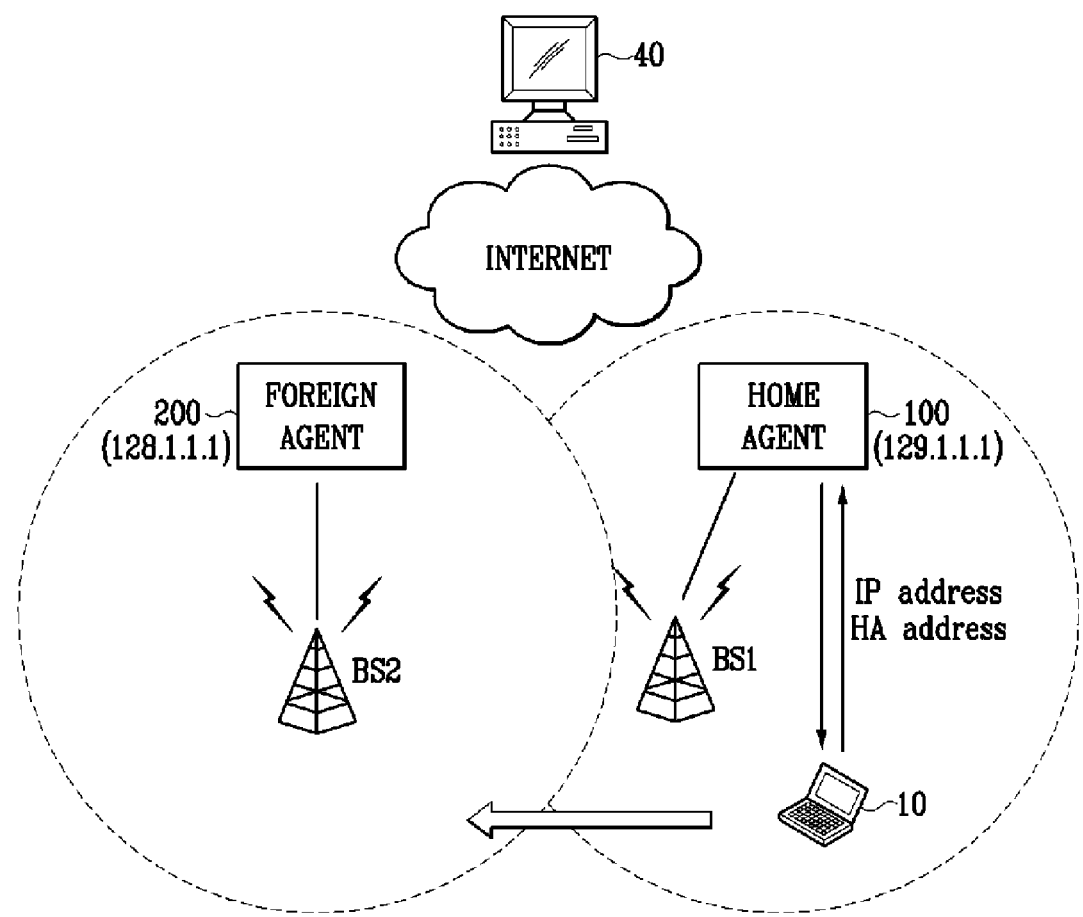
FIG. 7 is a schematic of a dynamic IP allocation system according to an embodiment of the present invention.

FIG. 7 is a schematic of a dynamic IP allocation system according to an embodiment of the present invention.

The dynamic IP allocation system according to an embodiment of the present invention comprises a home agent 100, and a foreign agent 200. The home agent 100 is a router in the home network that has registration information of a mobile subscriber station 10 and transmits a datagram to the current location of a terminal node 40. The foreign agent 200 is a router connected to a network currently accessed by the mobile subscriber station 10 when the mobile subscriber station 10 is roving apart from the home network. For expediency of description, the home agent 100 and the foreign agent 200 of which the functions can be implemented in base stations BS1 and BS2, respectively, are separately illustrated in the figure. The wireless portable Internet system may further include an AAA (Authentication Authorization and Accounting) server (not shown) for authentication authorization and accounting.

The mobile subscriber station 10 performs ranging and registration procedures in a network managed by the base station BS1, sets a mobile IP version to be allocated, and transmits the mobile IP version parameter to the home agent 100. The home agent 100 receives mobile IP version information and transmits a suitable mobile IP and a home agent address to the mobile subscriber station 10. The mobile subscriber station 10 communicates with the terminal node 40 on the Internet using the mobile IP. By using the mobile IP, the mobile subscriber station 10 has a hone address and a COA (Care Of Address) to use the same IP address even when it moves to the cell of another base station.

The mobile subscriber station 10 registers in the cell of the base station BS1 and receives the IP address and the home address from the home agent to set an IP address for Internet communication.

Hereinafter, a mobile subscriber station registration procedure and an IP address setting method will be described in detail.

Figure 8:
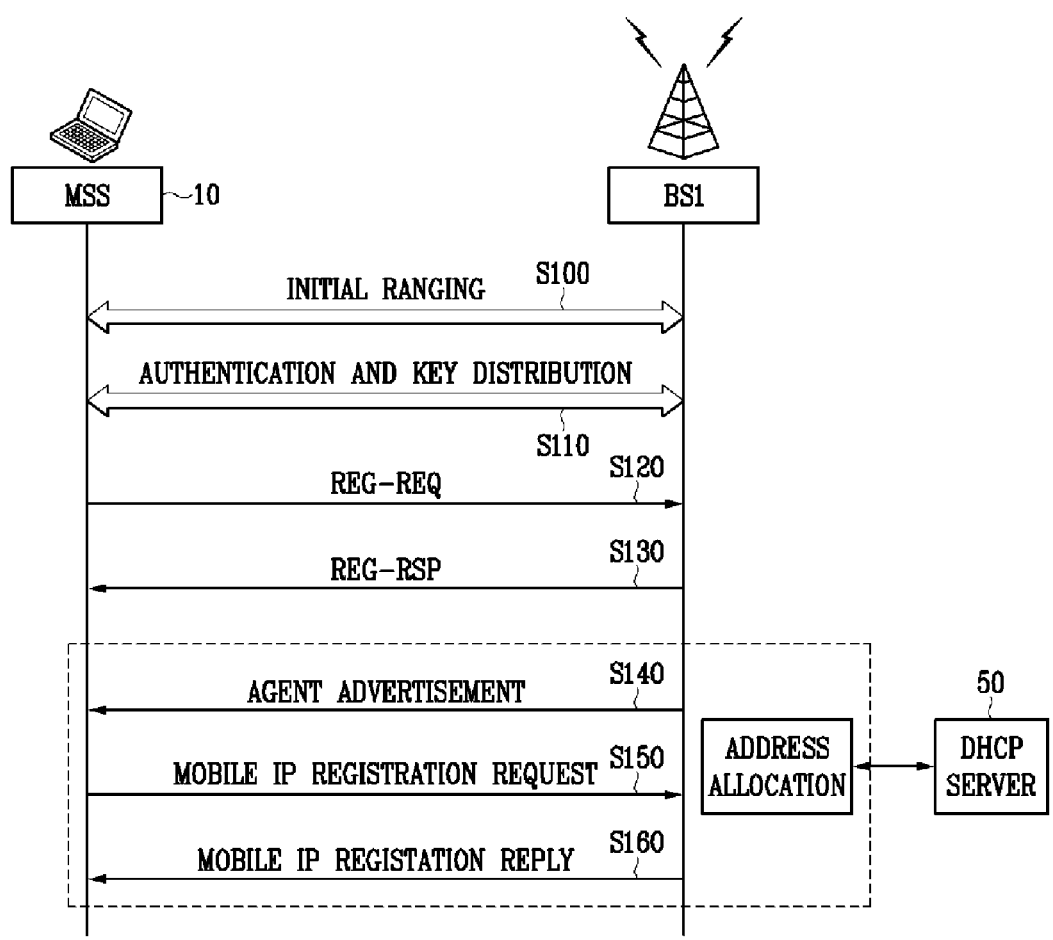
FIG. 8 is a signal flow chart showing a MAC connection establishment process according, to an embodiment of the present invention.

FIG. 8 is a signal flow chart showing a MAC connection establishment process according to an embodiment of the present invention.

When the mobile subscriber station 10 enters the cell of the base station BS1, the initial ranging between the mobile subscriber station 10 and the base station BS1 is performed, in step S100. The initial ranging is a procedure for acquiring information communication and timing synchronization among the mobile subscriber stations in the cell of the base station, which procedure is performed by communication of MAC messages.

Subsequently, an authentication procedure between the mobile subscriber station 10 and the base station BS1 is performed, in step S110. The authentication procedure is authenticating the mobile subscriber station rather than the subscriber. The authentication is achieved using the equipment address of the mobile subscriber station.

Once the mobile subscriber station is authenticated, a registration procedure of the mobile subscriber station is performed. In the registration procedure, a secondary management connection is established, and a registration request/response REG-REQ/RSP procedure for acknowledgement of the authentication is performed, in steps S120 and S130. Here, the mobile subscriber station 10 that intends to receive an address using the mobile IP address sets a mobile IPv4 flag to the IP version parameter of a registration request message REG-REQ and reports this fact to the base station BS1.

Usage of the mobile IP is reported by using the flag of the IP version parameter in the preferred embodiment, and the same can be reported by defining an additional parameter to the registration request/response message REG-REQ/RSP. That is, an additional parameter for showing whether to use a DHCP or a mobile IP can further be included in the registration request/response message REG-REQ/RSP, and then can be transmitted.

Once the mobile IPv4 is set as the mobile IPv4 parameter, the home agent of the base station BS1 transmits a mobile IP message, i.e., an agent advertisement message to the mobile subscriber station 10 via the secondary management connection, in step S140. In the embodiment of the present invention, a mobile IPv4 flag is contained in the registration request/response message among the MAC messages so as to discriminate the registration request/response message from the existing DHCP messages.

Upon receiving the agent advertisement message, the mobile subscriber station 10 transmits a mobile IP registration request message to the home agent via the secondary management connection, in step S150. With the mobile IP registration request message, the home agent, if managing an IP address pool, directly allocates the IP address. The home agent, if not managing the IP address pool, allocates the IP address through a connection to the DHCP server 50 and transmits the mobile IP message carried on a mobile IP registration reply message through the secondary management connection to the corresponding mobile subscriber station 10, in step S160. The base station BS1 may include a home agent as a functional entity for mobile IP registration.

As stated above, the message for mobile IP setting and registration is communicated through the secondary management connection of the MAC layer, so the mobile IP setting and registration procedure is performed in the mobile subscriber station registration step prior to the transport connection establishment step.

Namely, the mobile IP message is transported through the secondary management connection prior to the transport connection establishment for traffic transfer to achieve dynamic address allocation, thereby reducing a connection establishment time.

FIG. 9 shows an IP version parameter format used in the embodiment of the present invention.

For address allocation using the mobile IP, as described previously, a mobile IP flag is established to an IP version parameter in the REG-REQ/RSP message that is a MAC message-communicated between the mobile subscriber station and the base station. In the conventional IEEE 802.16 system, IPv4 301 and IPv6 302 are used as the flag of the IP version parameter. In the embodiment of the present invention, a flag for identification of a mobile IPv4 303 is added to bit #3 so as to check the address allocation using the mobile IP in the mobile subscriber station registration request REG-REQ step.

Figure 10:
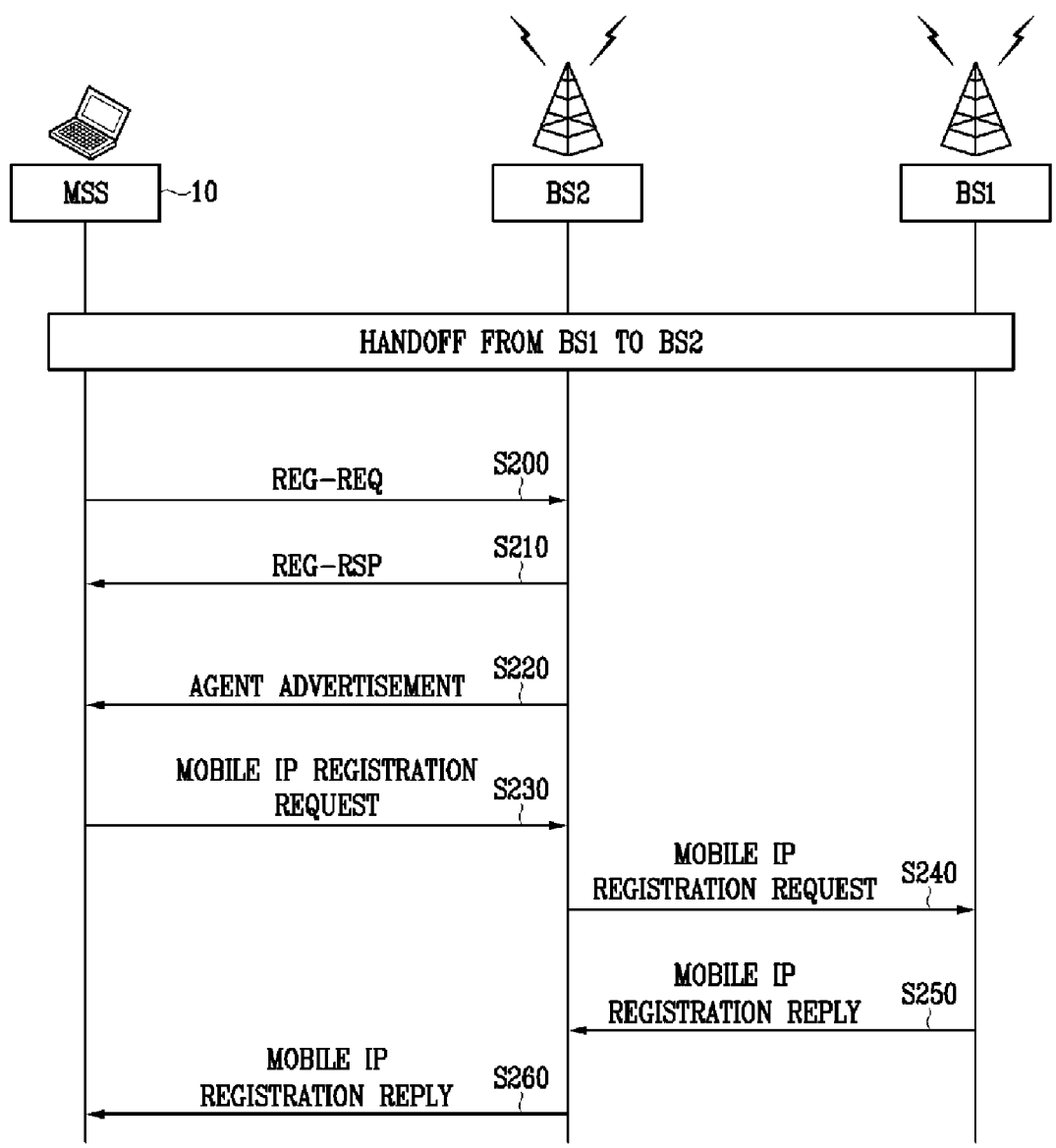
FIG. 10 is a signal flow chart showing a handover procedure according to an embodiment of the present invention.

FIG. 10 is a signal flow chart showing a handover procedure according to an embodiment of the present invention.

The mobile subscriber station 10 registers an IP address and a home address using a MAC message on the secondary connection.

Subsequently, the mobile subscriber station 10 moves to a cell managed by the base station BS2 for a handover.

After the handover procedure, the MAC message REG-REQ/RSP necessary to the registration of the mobile subscriber station is communicated between the mobile subscriber station 10 and the base station BS2, in steps S200 and S210. During the REG-REQ/RSP message communication, the MAC message contains the mobile IPv4 flag established IP version parameter defined in FIG. 9 and carries IP version information.

On the other hand, the base station BS2 performs an agent advertisement through the secondary management connection, in step S220. The mobile subscriber station 10 acquires a COA from the agent advertisement.

The mobile subscriber station 10 transmits a mobile IP registration request message for the allocated IP address to the new base station BS2, in step S230.

n receiving the mobile IP registration request message, the base station BS2 recognizes the previous base station BS1 as a home agent and relays the mobile IP registration request message to the base station BS1, in step S240.

The base station BS1 receiving the registration request message generates a mobile IP registration reply message and transmits the generated reply message to the base station BS2, in step S250.

Upon receiving the registration reply message, the base station BS2 transmits the registration reply message to the mobile subscriber station through the secondary management connection, in step S260. The home address binds the COA by the registration procedure.

The base stations BS1 and BS2 can include a home agent and a foreign agent, respectively, as a functional entity in the mobile IP processing procedure.

In this way, the base station BS1 as the home agent detects that the mobile subscriber station is present in the cell of the base station. BS2, and relays data signals received from the terminal node to the foreign agent. Accordingly, the mobile subscriber station can continue communication with the terminal node using the home IP address after a handover.

Figure 11:
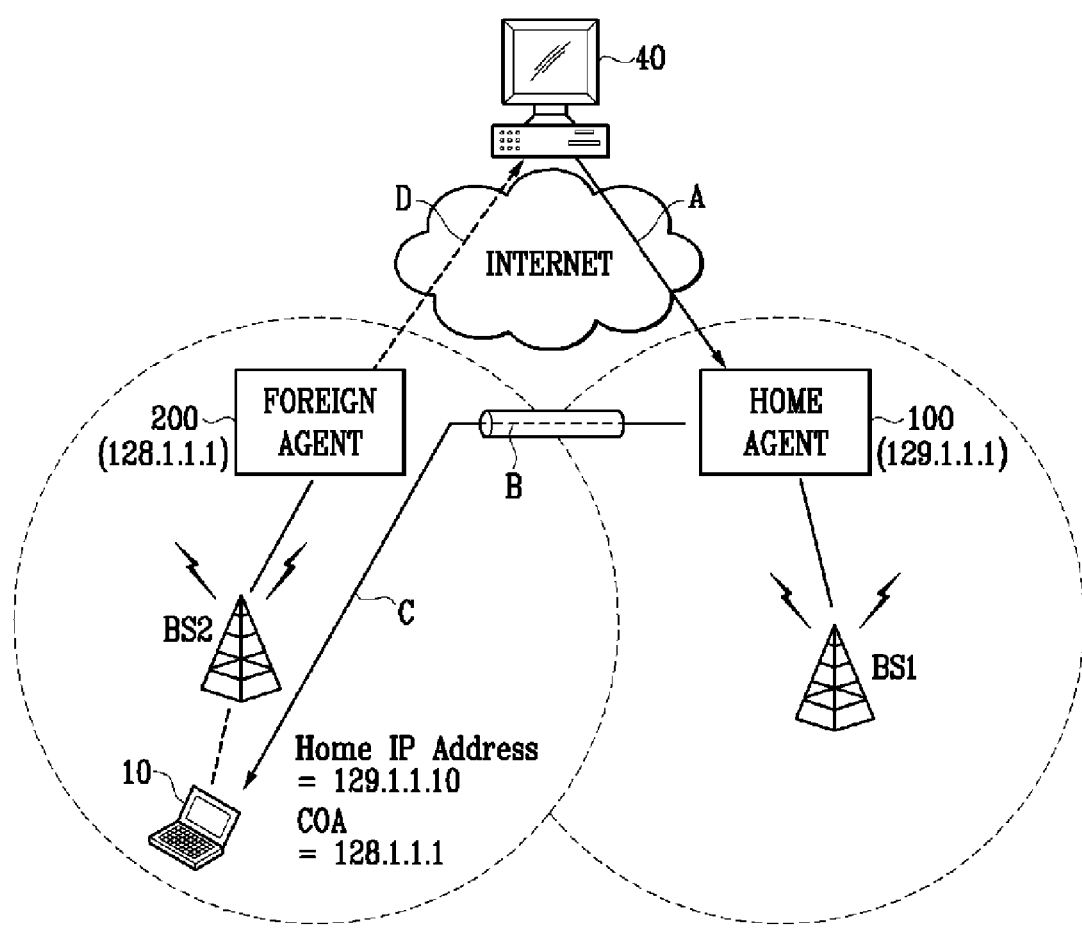
FIG. 11 is a schematic diagram showing the result of IP allocation using a mobile IP according to an embodiment of the present invention.

FIG. 11 is a schematic diagram showing the result of IP allocation using a mobile IP according to an embodiment of the present invention.

As stated above, the mobile subscriber station moving to the base station BS2 has an IP address of "129.1.1.10" allocated from the home agent 100 and acquires a COA of "128.1.1.1" from the agent advertisement message of the foreign agent.

The mobile subscriber station 10 transmits the mobile IP registration request message including the home IP address information to the foreign agent 200 through the secondary management connection. Then, the foreign agent 200 relays the registration request message to the home agent 100 using the network address of the home IP address.

The home agent 100 transmits a registration reply message to the foreign agent 200 in response to the registration request, and the foreign agent 200 transmits the registration reply message to the mobile subscriber station 10. In this registration procedure, the router of the base station BS1 is registered as a home agent, and the router of the base station BS2 is registered as a foreign agent.

Therefore, the mobile subscriber station 10 communicates with the terminal node 40 using the foreign agent 200 and still uses the home IP address of "129.1.1.10." The terminal node 40 transmits traffic to the hone IP address of "129.1.1.10", and the home agent 100 encapsulates the traffics with the COA to bind the foreign agent 200.

The foreign agent 200 releases the capsule of the traffic and transmits the traffics to the mobile subscriber station 10.

The above-stated IP address request and allocation procedures are achieved through the secondary management connection of IEEE 802.16e, so a seamless service can be provided by rapidly performing a dynamic IP allocation using a mobile IP even during a handover.

Subsequent two cases can be considered when a subscriber station is allocated with a dynamic address caused by a mobile IP and moves to another base station area, that is, when a handover is generated.

The first case is a movement between base stations belonging to the same subnet, and the second case is a movement between base stations belonging to different subnets. No mobile IP registration is needed when the above-noted subnet is not changed after the user has moved to another base station. Subnet information is modified when the base stations share configuration information. In this instance, the configuration information includes ID information of the base stations, IP address information, and radio parameters which are given in advance to the adjacent base stations, and the configuration information is predefined before the base stations are operated.

The subnet represents a network area managed by a single router which is provided at a higher level than the base station.

Accordingly, the dynamic address allocation method by the mobile IP is to be performed based on the subnet modification.

In addition, a motion detection method for determining whether to register the mobile IP again in the case of a handoff is provided, wherein the subscriber station compares the lifetime of the mobile IP included in an agent advertisement message and the subnet information with the current subscriber station status and determines whether to register the mobile IP again assuming that the subscriber station periodically receives the agent advertisement message in the network such as a cable network or a wireless LAN which supports no mobility of Layer 2.

However, the periodical transmission and receiving of the agent advertisement messages in the wireless portable Internet system spends radio resources, and hence, an improved notion detection method for saving the radio resources is applied to the preferred embodiment of the present invention.

Figure 12:
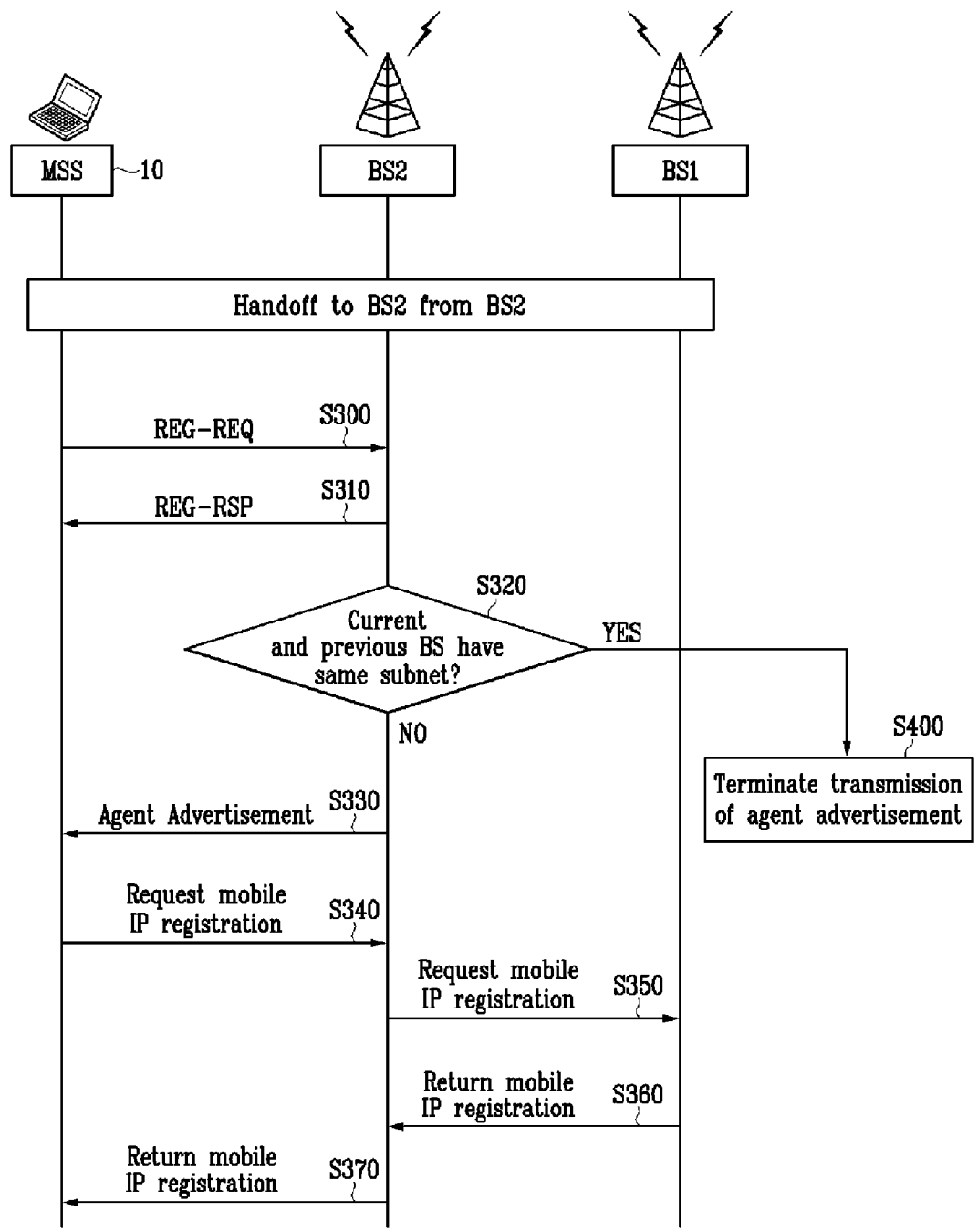
FIG. 12 shows a signal flowchart for a handover process according to a preferred embodiment of the present invention.

FIG. 12 shows a signal flowchart for a handover process according to a preferred embodiment of the present invention.

When the subscriber station 10 roves to the base station BS2 from the base station BS1 to generate a handover, MAC messages REG-REQ/RSP for a subscriber station registration process between the subscriber station 10 and the base station BS2 are exchanged in steps S300 and S310. The MAC messages transmit IP version information including the mobile IP flag defined in FIG. 9 when the REG-REQ/RSP messages are exchanged.

The base station BS2 determines whether the previous base station BS1 and the current base station BS2 have the same subnet in step S320. That is, the motion detection is executed not by the subscriber station 10 but by the target base station BS2 on the network.

A mobile IP registration process is required when the base stations BS1 and BS2 are found to have different subnets in step S320, and no IP registration process is required when the base stations BS1 and BS2 are found to have the same subnet.

When no IP registration process is needed, the base station BS2 transmits no agent advertisement message to the subscriber station in step S400. Accordingly, the subscriber station requests a mobile IP registration when receiving an agent advertisement message, and transmits no mobile IP registration request message when receiving no agent advertisement message. The communication is maintained by equal to or greater than Layer 3 without detecting the handoff.

When the base stations BS1 and BS2 are found to have different subnets, the base station BS2 transmits an agent advertisement message to the subscriber station 10 in step S330. The agent advertisement is performed through a secondary management connection, and the subscriber station 10 acquires a COA through the agent advertisement.

The subscriber station 10 accordingly transmits a mobile IP registration request message on the allocated IP address to the new base station BS2 in step S340.

The base station BS2 receives the mobile IP registration request message, detects the previous base station to be a home agent, and relays the mobile IP registration request message to the base station BS1 in step S350.

The base station BS1 receives the mobile IP registration request message, generates a mobile IP registration response return message, and transmits it to the base station BS2 in step S360.

The base station BS2 receives the mobile IP registration response return message, and transmits a registration return message to the subscriber station through the secondary management connection in step S370. Through the above-described registration process, the home address and the COA are bound.

That is, the mobile IP registration process is performed according to the described embodiment when the subnet information is modified.

Since the movement detection is performed by the network, no agent advertisement message for introducing a mobile IP registration is transmitted in the case of the handoff between the base stations with the same subnet, thereby saving the radio resources used for the agent advertisement message transmitted to a specific subscriber station.

According to the aforementioned configuration, the IEEE 802.16e wireless portable Internet system can support a handover function using a mobile IP for the subscriber using a dynamic address allocation method to provide a seamless service. The use of the secondary management connection during the transfer of the mobile IP message reduces the time for transport connection establishment during a handoff using the mobile IP, thereby supporting a more rapid handoff.

In addition, the number of additional connection identifiers between the mobile subscriber station and the base station can be reduced by not using an additional connection identifier for the mobile IP.

Further, the network detects modification of subnet information and saves the radio resources caused by unnecessary agent advertisements.

While this invention has been described in connection with what is presently considered to be the most practical and preferred embodiment, it is to be understood that the invention is not limited to the disclosed embodiments, but, on the contrary, is intended to cover various modifications an equivalent arrangements included within the spirit and scope of the appended claims.

The invention claimed is:

1. A method for a subscriber station to move to a second base station from a first base station and register a mobile IP in a wireless portable Internet system, the method comprising:
   (a) the second base station and the mobile subscriber station performing a handover;
   (b) the mobile subscriber station performing a re-registration with the second base station;
   (c) transmitting a re-registration request message including a flag showing whether to assign an address using a DHCP (Dynamic Host Configuration Protocol) or a mobile IP to the second base station;
   (d) the mobile subscriber station acquiring a COA (Care Of Address) from an agent advertisement transmitted from the second base station so as to assign an address using the mobile IP when the flag is set to assign an address using the mobile IP;
   (e) the mobile subscriber station transmitting a mobile IP registration request message for an IP address allocated from the first base station during a MAC connection establishment;
   (f) the second base station relaying the mobile IP registration request message to the first base station during the MAC connection establishment; and
   (g) the first base station transmitting a reply message to the mobile IP registration request message to the mobile subscriber station via the second base station.

2. The method as claimed in claim 1, wherein the steps (d) to (g) are performed through a secondary management connection.

3. The method as claimed in claim 2, further comprising:
   binding the COA and the IP address allocated from the first base station.

4. The method as claimed in claim 3, wherein the first base station is set as a home agent, the second base station being set as a foreign agent.

5. A method for a subscriber station to move to a second base station from a first base station and register a mobile IP in a wireless portable Internet system, the method comprising:
   (a) the second base station and the mobile subscriber station performing a handover;
   (b) transmitting a registration request message including a flag showing whether to assign an address using a DHCP (Dynamic Host Configuration Protocol) or a mobile IP to the second base station;
   (c) the second base station determining whether the first and second base station have the same subset information;
   (d) the second base station terminating transmission of an agent advertisement to the subscriber station when the first and second base station are found to have the same subset information; and
   (e) registering a mobile IP through a secondary management connection so as to assign an address using the mobile IP when the flag is set to assign an address using the mobile IP and the first and second base station are found to have different subset information.

6. The method of claim 5, wherein (e) comprises:
   the second base station transmitting the agent advertisement so as to assign an address using the mobile IP;
   the subscriber station acquiring a COA (care of address) from an agent advertisement transmitted from the second base station;
   the subscriber station transmitting a mobile IP registration request message on an IP address allocated by the first base station while establishing an MAC connection;
   the second base station relaying the mobile IP registration request message to the first base station while establishing the MAC connection; and
   the first base station transmitting a return message on mobile IP registration request message to the subscriber station through the second base station.

7. An apparatus for a wireless portable Internet system, the apparatus comprising:
   a first base station for performing a function of a home agent for a subscriber station;
   a second base station for performing a function of a foreign agent for the subscriber station due to moving to the second base station from the first base station; and
   the subscriber station for requesting a re-registration to the second base station through a re-registration message including a flag showing whether to assign an address using a DHCP (Dynamic Host Configuration Protocol) or a mobile IP when the subscriber station moves to the second base station from the first base station, acquiring a Care of Address (COA) from an agent advertisement transmitted from the second base station when the flag is set to assign an address using the mobile IP and performing a mobile IP registration on the second base station during a Media Access Control (MAC) connection establishment,
   wherein the second base station sends a mobile IP registration request including the COA to the first base station according to the mobile IP registration request of the subscriber station; and
   wherein the first base station performs the mobile IP registration for the subscriber station according to the mobile IP registration request of the second base station.

8. The apparatus of claim 7, wherein the agent advertisement and the mobile IP registration request are performed through a secondary management connection.

9. The apparatus of claim 7, the mobile IP registration for the subscriber station on the first base station is performed by binding the COA and a home address of the subscriber station.

10. The apparatus of claim 7, wherein the second base station determines whether the first and second base station have the same subset information according to the mobile IP registration request of the subscriber station and performs the re-registration for the subscriber station when the first and second base station are found to have different subset information.

11. An apparatus for a wireless portable Internet system, the apparatus comprising:
   a first base station for performing a function of a home agent for a subscriber station;
   a second base station for performing a function of a foreign agent for the subscriber station due to moving to the second base station from the first base station; and
   the subscriber station for requesting a re-registration to the second base station through a re-registration message including a flag showing whether to assign an address using a DHCP (Dynamic Host Configuration Protocol) or a mobile IP when the subscriber station moves to the second base station from the first base station,
   wherein the second base station performs a mobile IP registration through a secondary management connection in cooperation with the subscriber station when the flag is set to assign an address using the mobile IP and the first and second base station are found to have different subset information.

12. The apparatus of claim 11, wherein the second base station transmits an agent advertisement including a COA (care of address) to the subscriber station for the mobile IP registration and the subscriber station performs a mobile IP registration on the second base station during a Media Access Control (MAC) connection establishment.

* * * * *